March 12, 1929.     C. F. BALL     1,705,352
SPROCKET CHAIN
Filed March 2, 1927
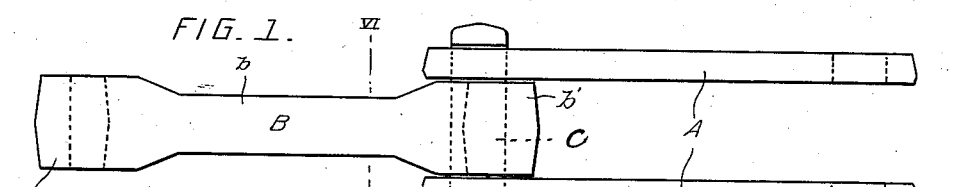
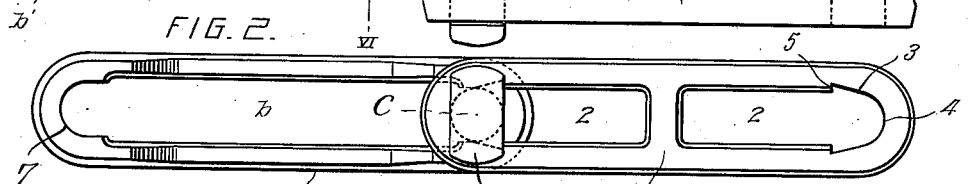
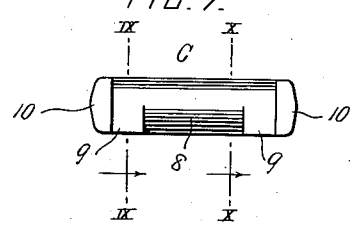
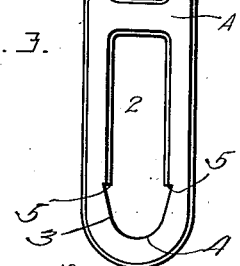
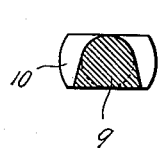
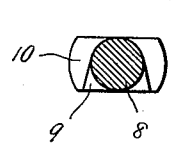
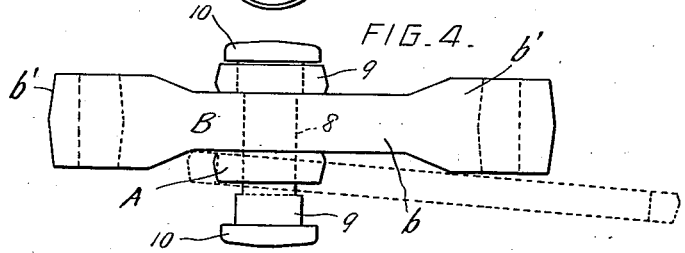
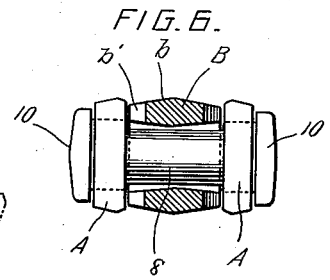
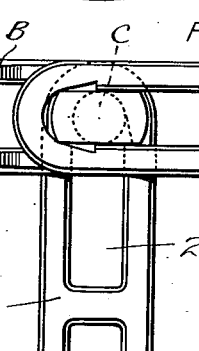
Inventor
CHARLES F. BALL
By John S. Barkad
Attorney Patented Mar. 12, 1929.

1,705,352

UNITED STATES PATENT OFFICE.

CHARLES F. BALL, OF MILWAUKEE, WISCONSIN, ASSIGNOR TO CHAIN BELT COMPANY, OF MILWAUKEE, WISCONSIN, A CORPORATION OF WISCONSIN.

SPROCKET CHAIN.

Application filed March 2, 1927. Serial No. 172,062.

My invention relates to drive and power-transmitting chains intended to be used in connection with sprocket wheels, wherein the links are connected by pins that may be removed when the links are turned to certain arbitrary positions to permit separation of the links of the chain, but which are securely held in place when the parts of the chain are in working positions. Chains of this character are used for many purposes, especially where heavy work is to be performed.

The invention has for its object to improve the construction of the parts of the chain at their joints of articulation, as will be pointed out in the following specification.

Fig. 1 is a plan view of two links of a chain embodying my invention, in working position.

Fig. 2 is a side view thereof.

Fig. 3 is a side view showing the links moved to position to permit either coupling or uncoupling of the links.

Fig. 4 is a plan view with the parts in the position indicated in Fig. 3, and illustrating some of the steps followed in either coupling or uncoupling the links.

Fig. 5 is a view similar to Fig. 3 except that the positions of some of the parts are different, being such as are assumed at a certain period in coupling or uncoupling.

Fig. 6 is a view taken on the line VI—VI of Fig. 1.

Fig. 7 is an elevation of the connecting pintle, detached.

Fig. 8 is an end view of the pintle.

Figs. 9 and 10 are transverse sectional views taken respectively on the lines IX—IX and X—X of Fig. 7.

A chain embodying my invention is built up from duplicate parts of three particular forms; side bars A, pairs of which constitute the two-bar links; links B, constituting the single-bar links; and coupling pins C, uniting the single-bar and the two-bar links. The bars A are formed from flat metal, such as steel bars, malleable iron castings, or drop forgings, and have formed in them longitudinal openings 2. There are preferably two such openings in each bar separated from each other by an intermediate part of the bar itself, though this is merely a matter of structural detail and there might be but a single opening if preferred. At the ends of the openings 2, towards the ends of the bar, there are enlarged seats shaped to fit the intermediate portions of the coupling pins, which lie therein when the links are connected. These portions of the openings 2 are of a form approximating a parabola, as indicated by 3, terminating in the shoulders 5 and having the central curved wearing faces or seats 4, with which engage the outer curved faces of the portions 9 of the pins C. The portions 3 of the coupling pin seats expand or flare inwardly, that is, toward the center of the link, and at their inner and widest portions are somewhat wider than the main parts of the elongated opening 2, thus forming shoulders 5 at the junction of the pin seat with the parallel walls or sides of the opening 2.

The single bar links B have a narrow waist or intermediate portion $b$ and thickened ends $b'$, as clearly represented in Figs. 1 and 4. Through this bar is formed a longitudinal opening 6 terminating toward the ends of the link in bearings 7 for the central cylindrical portions of coupling pins.

The coupling pin has a central cylindrical portion 8, of a length approximately equal to the width of the end portion $b'$ of the single bar link B; enlarged intermediate portions, 9, 9, of a shape approximating a parabola in cross section, beyond the central cylindrical portion, 8, of the pin, each of a length approximately equal to the thickness of one of the bars A; and cross heads 10, at the ends of the pin. These three parts all have one transverse dimension of the same length, which is equal to the diameter of the cylindrical portion, 8, as is clearly represented by Figs. 7 to 10. The greatest transverse dimension of each intermediate part 9 of a pin is at the rear face of the pin, that is the face away from that end of the link bar A in which the pin is seated, and this dimension is greater than the diameter of the cylindrical part 8, and is also greater than the cross dimension of the opening 2 in the bar A. This makes it impossible for the intermediate part of the pin to enter the seat therefor in the bar A, except by an endwise movement along the coupling pin. The heads 10 of the pin C are of oblong construction as represented in Figs. 8 to 10, the shorter dimension being preferably equal to the diameter of the central cylindrical portion of the pin, and the longer dimension being preferably greater than the greatest transverse dimension of the intermediate portions 9, and the two heads are so disposed as to lie opposite one another. It follows that the heads may pass through the openings 2 in the bars A of the chain links when they are arranged as represented in Fig. 3 and 5, but lie transversely across such openings when the parts of the chain are in working position, as represented in Figs. 1 and 2, thus serving to hold the bars of the chain against sidewise separation.

Should it be desired to separate the chain at one of its joints, the connecting pin to be removed is slipped out of its seat 7 in the bar B, moving inwardly into the slot or opening 6, which is preferably of a little greater width than the seats 7. By reason of the shape of the portions 9 of the coupling pin and the fact that these parts fit seats provided therefor in the bars A, it follows that when the pin is moved inwardly along the link B to the position indicated in Figs. 3, 4 and 5, the two-bar link engaging therewith is moved with the pin toward the center of the link B. The bars A are then turned at right angles to the link B, as represented in Fig. 3. These movements bring the two bars A opposite the narrow waist portion b of the single bar link, permitting these bars to be moved toward each other, so as to rest in engagement with the opposite faces of the narrow portion of the bar B. Preferably but one of the bars A is moved inwardly along the pin, as represented in Fig. 4, in order that such bar may be entirely freed from the portion 9 of the pin, bringing it opposite to the central cylindrical part thereof, 8. It may then be turned, as indicated by dotted lines in Fig. 4, and full lines Fig. 5, to a position parallel with the bar B, and when this occurs the pin may be moved endwise relative both to the near bar A and the bar B, for the openings 2 and 6, respectively, in these bars are now disposed in such relation to the eccentric portions 10 and 9 of the pin that the latter may pass freely through the openings. This disconnects the chain, and after that it is an easy matter to remove the pin from the single link A with which it is still in engagement. The coupling of the links may take place by reverse movements of the parts to what has just been set forth.

It will be seen that the portions 9 of the connecting pins serve to prevent rotation of the pins in the bars A, and also prevent the movements of the pins lengthwise of such bars so long as such parts are seated in said bars, no matter what may be the relative positions of the links A and B, and that the said parts 9 of the pins can enter their seats in the link bars A only endwise.

This is true because the corners of the intermediate portions 9 of the connecting pins when seated in the links A abut against the shoulders 5, and it follows from the construction and relation of parts described that when the chain is assembled the two bars of the link A and the two connecting pintles C at its opposite ends act as a unitary structure so far as any relative movement between these parts is concerned. In the use of a chain of this kind it sometimes happens that the links are not held under sufficient tension to maintain the connecting pins in their seats and they may be moved therefrom without positive intent. When any such movement occurs with a chain constructed according to the present invention the only movement of a connecting pin relative to the links of the chain is relative to the bar link B with which it is connected. No movement relative to the bars of link A can take place. And this is desirable, because should such unintentional movement of a pin take place in a chain constructed according to my invention, when the parts are again put under tension and straightened out the pin readily comes to proper place, because it is only necessary that a cylindrical portion thereof be brought into engagement with a half cylindrical seat and the walls of the opening 2 lead to that seat. On the other hand, should pin C move out of its seats in the bars A and while out of such seats there be any rotative movement of such pin, then, when the chain is straightened out and put under tension, the pin would not necessarily and certainly come to proper seating in the bars A, with results that might be disastrous to the chain.

Among the advantages incident to my invention are the simplicity of the several parts that enter into the construction of the chain, making their manufacture easy; the fact that those portions of the connecting pins that engage with the plates or bars A of the two-part links are of wedge shape causes the pins to seat securely in such bars under working conditions, the greater the strain upon the chain the more tightly are the parts held; and the further fact that the arrangement described causes a locking together of the parts of the chain under working conditions which is not affected by the elongation of the chain due to wear.

What I claim is:

1. A separable chain formed of alternate single bar and double bar links united by connecting pins, the links of both kinds being formed with longitudinal slots through which the pins may be passed, terminating in seats shaped to fit the bars of the connecting pins that lie therein, the pins being formed with central cylindrical portions that turn in the seats therefor in the single bar links, with intermediate portions seated respectively in the bars of the two-bar link and with heads for preventing sidewise separation of the coupled links when they are in working position, the intermediate portions of the coupling pins being of a form in cross section approximating a parabola to prevent the pins turning in the seats therefor in the two-bar links and also to prevent removal of the pins from said seats except by endwise movement.

2. A separable chain formed of alternate single bar and double bar links united by coupling pins, the pins having each a central cylindrical portion seated to turn freely in a single bar link, intermediate portions of a form in cross section approximating a parabola seated in a two bar link, and head portions located outside the two-bar link, the three named portions of the pins having one transverse dimension in common, the intermediate portions having one transverse dimension at least greater than the diameter of the central portion, and the head portions having one transverse dimension greater than the corresponding dimension of the intermediate parts of the pin, there being in the links elongated openings through which the pins may pass endwise when turned with their longer dimensions corresponding with the length of the slots but through which they cannot pass when the pins are turned with the eccentric parts transverse to the slots, as when the pins are properly seated in the links and the links in working position the ends of such elongated openings terminating in seats shaped to fit the parts of the pins that engage therewith, and there being shoulders at the ends of the pin seats in the two-bar links, for the intermediate portions of the pins that prevent the pins under any circumstances when seated therein from moving longitudinally relative to the two-bar links.

3. A separable chain formed of alternate single bar and double bar links united by connecting pins, the links of both kinds being formed with longitudinal slots through which the pins may be passed endwise when turned into proper position, the slots terminating in seats shaped to fit the parts of the pins which are respectively to engage therewith under working conditions, the pins being formed with central cylindrical portions that turn in the seats therefor in the single bar links and that may be moved therefrom longitudinally on the slackening of the chain, and with other portions seated respectively in the bars of the two-bar links, the portions of the pins engaging with the two-bar links and the seats in the bars fitted to receive them being constructed to prevent longitudinal movement of the pins relative to the two-bar links under any conditions.

4. A separable chain formed of alternate single bar and double bar links united by connecting pins the links of both kinds being formed with longitudinal slots through which the pins may be passed endwise when the pins are properly related thereto, the slots terminating in seats shaped to fit the parts of the pins intended to engage therewith, the pins being formed with central cylindrical portions that turn in the seats therefor in the single bar links under working conditions, with intermediate portions seated respectively in the bars of the two-bar links, shaped to prevent turning of the pins in said two-bar links under working conditions, and with heads for preventing sidewise separation of the coupled links while in working position, the two-bar links being provided with stop or abutment portions with which engage the intermediate portions of the connecting pins when seated, such stops or abutments preventing any longitudinal movement of the pins relative to the two bar links so long as the pins are seated.

CHARLES F. BALL.